US012613974B2

(12) United States Patent
Kapoor

(10) Patent No.: US 12,613,974 B2
(45) Date of Patent: *Apr. 28, 2026

(54) SYSTEMS AND METHODS FOR VALIDATION OF A DEVICE

(71) Applicant: INTEGRITY Security Services LLC, Santa Barbara, CA (US)

(72) Inventor: Amit Kapoor, San Francisco, CA (US)

(73) Assignee: INTEGRITY SECURITY SERVICES LLC, Santa Barbara, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 18/603,782

(22) Filed: Mar. 13, 2024

(65) Prior Publication Data

US 2025/0165615 A1 May 22, 2025

Related U.S. Application Data

(63) Continuation of application No. 18/517,713, filed on Nov. 22, 2023, now Pat. No. 11,934,537.

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 9,177,153 | B1 * | 11/2015 | Perrig | ..................... G06F 21/57 |
| 9,697,226 | B1 * | 7/2017 | Youngworth | ......... G06F 3/0655 |
| 2017/0262658 | A1 * | 9/2017 | Salmon-Legagneur | ..................... H04L 9/3268 |
| 2022/0318372 | A1 * | 10/2022 | Slik | ......................... G06F 21/64 |

* cited by examiner

*Primary Examiner* — Fatoumata Traore
(74) *Attorney, Agent, or Firm* — MH2 Technology Law Group, LLP

(57) ABSTRACT

A first processing sends a validation request is sent, which includes a random number seed and a nonce to a second processing device. The first processing device generates a first set of random numbers using the random number seed according to an algorithm for random number generation, and maps the generated first set of random numbers to memory blocks that include a copy of software for the second processing device. A first hash is calculated from contents of the mapped memory blocks concatenated to the nonce. A second hash, calculated using information included in the validation request, the mapping model, the software for the second processing device, and the nonce is received. An action is automatically performed when the hashes do not match.

23 Claims, 7 Drawing Sheets

SYSTEMS AND METHODS FOR VALIDATION OF A DEVICE

CROSS-REFERENCE TO RELATED APPLICATIONS

This is a continuation of U.S. patent application Ser. No. 18/517,713, filed Nov. 22, 2023. The disclosure of U.S. patent application Ser. No. 18/517,713 is hereby incorporated herein by reference in its entirety.

FIELD OF THE INVENTION

This application relates to systems, devices, manufactures, and methods for efficiently validating whether an application is most likely uncompromised.

BACKGROUND

An application is uncompromised if the application or its associated data have not been corrupted or have not been modified by an unauthorized user or process. Typically, when validating that an application is uncompromised, a computing device may calculate a checksum or a hash over all instructions and static data of the application using a same algorithm as was used to calculate a known correct checksum or hash over all instructions and static data of an uncompromised official copy of the application. The computing device may compare the calculated checksum or hash to the known correct checksum or hash of the uncompromised official copy of the application. When the application is uncompromised, the calculated checksum or hash and the known correct checksum or hash are equal. Otherwise, the unmatched calculated checksum or hash and the known correct checksum or hash indicate that the application has been corrupted or compromised.

When an application is relatively long and requires a large amount of processing resources, validating that the application is uncompromised by calculating a checksum or hash over all instructions and static data of the application may consume a great amount of the processing resources, thereby negatively affecting processing resources available for use by the application.

SUMMARY

In a first aspect of various embodiments, a method is provided for validating a state of a second processing device. According to the method, a first processing device sends a validation request to the second processing device. The validation request includes a random number seed and a nonce. The first processing device generates a first set of random numbers using the random number seed according to an algorithm for random number generation. Based on a mapping model, the first processing device maps the generated first set of random numbers to a set of memory blocks including a copy of software for the second processing device. The first processing device concatenates contents of the set of mapped memory blocks to the nonce and calculates a first hash of the contents of the set of mapped memory blocks concatenated to the nonce. The first processing device receives a second hash from the second processing device in response to the sending of the validation request, wherein the second hash had been calculated by the second processing device using information included in the validation request, the mapping model, the software for the second processing device, and the nonce. The first processing device compares the first hash to the second hash and automatically performs an action when the first hash and the second hash do not match.

In a second aspect of the various embodiments, a system is provided for validating a state of a second processing device. The system includes a first processing device that further includes at least one first processor and a first memory. The first memory includes computer-readable instructions that, when executed by the at least one first processor, cause the first processing device to perform first operations. According to the first operations, the first processing device sends a validation request including a random number seed and a nonce. A first set of random numbers is generated by the first processing device using the random number seed according to an algorithm for random number generation. Based on a mapping model, the first processing device maps the generated first set of random numbers to a set of memory blocks that include a copy of software for the second processing device. Contents of the set of mapped memory blocks are concatenated to the nonce and a first hash of contents of the set of mapped memory blocks concatenated to the nonce is calculated. The first processing device receives a second hash from the second processing device in response to the sending of the validation request, the second hash having been calculated by the second processing device using information included in the validation request, the mapping model, the software for the second processing device, and the nonce. The first processing device compares the first hash to the second hash and automatically performs an action when the first hash and the second hash do not match.

In a third aspect of the various embodiments, a non-transitory computer-readable storage medium is provided that has first instructions and second instructions recorded thereon for validating a second processing device. When the first instructions are executed on a first processing device, the first instructions cause the first processing device to perform first operations. According to the first operations, a validation request is sent, which includes a random number seed and a nonce. A first set of random numbers is generated using the random number seed according to an algorithm for random number generation. The generated first set of random numbers is mapped to a set of memory blocks including a copy of software for the second processing device. Contents of the set of mapped memory blocks are concatenated to the nonce and a first hash of the contents of the set of mapped memory blocks concatenated to the nonce is calculated. A second hash is received from the second processing device in response to the sending of the validation request, the second hash having been calculated by the second processing device using information included in the validation request, the mapping model, of the software for the second processing device, and the nonce. The first processing device compares the first hash to the second hash and automatically performs an action when the first hash and the second hash do not match.

DETAILED DESCRIPTION

Various embodiments and implementations provide systems, devices, methods, and non-transitory computer-readable storage media for securely validating that an executing application on a device is most likely uncompromised. An application is uncompromised if the application and its data have not been modified in any way by an unauthorized source. In the various embodiments and implementations, repeated successful validations that an executing application is uncompromised may improve a likelihood that the executing application is uncompromised because contents of different memory blocks of a trusted official copy of the executing application, which may include computer instructions, static data, or changeable data, may be included in each first hash calculation, results of which may be compared to a second hash calculation of corresponding memory blocks of the executing application on the device. When the first hash calculation and the second hash calculation produce equal results, the executing application is considered to be most likely uncompromised.

Figure 1:
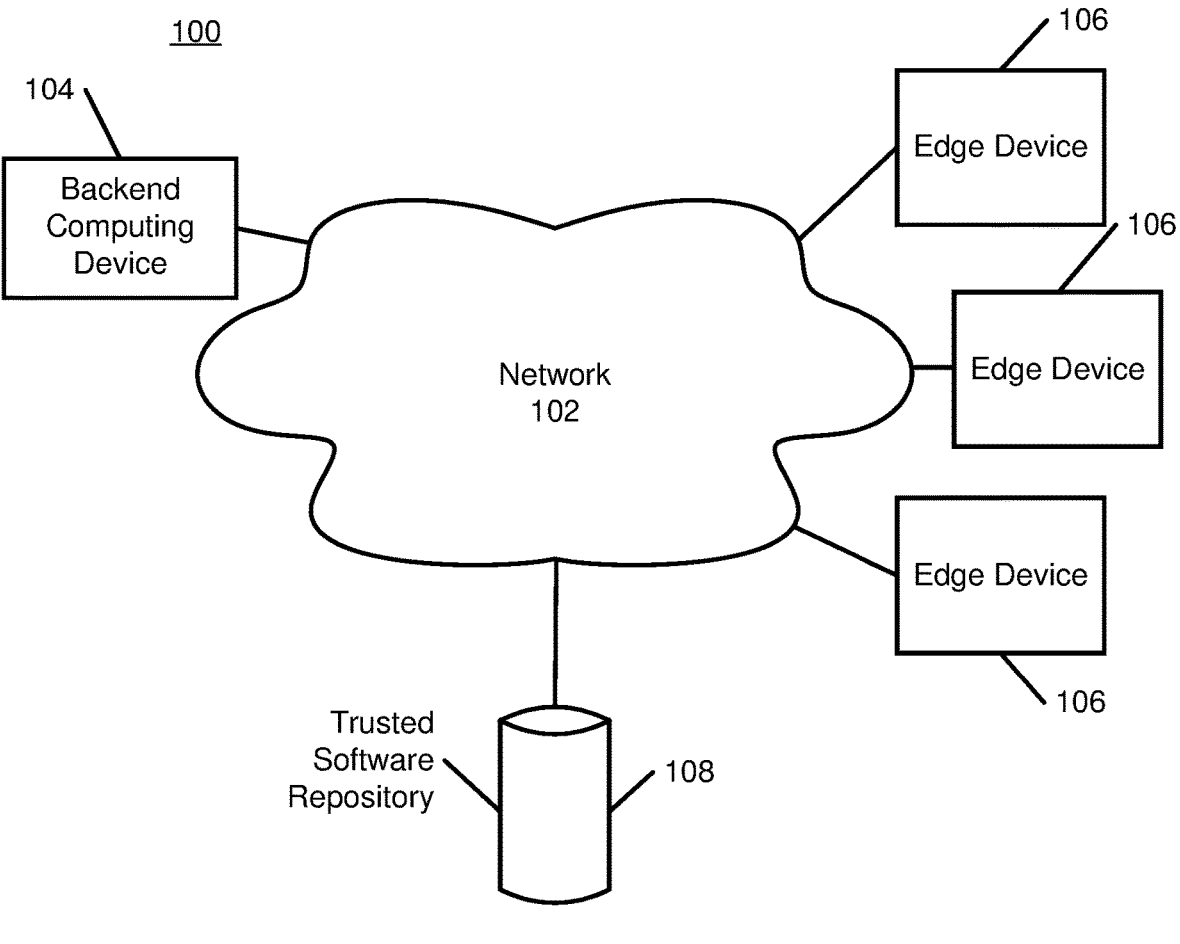
FIG. 1 shows an example environment for implementing various embodiments.

FIG. 1 illustrates an example environment 100 in which various embodiments may be implemented. Environment 100 may include a network 102 and at least one backend computing device 104, one or more edge devices 106, and a trusted software repository 108 connected to network 102. Network 102 may include a local area network (LAN), a wide area network (WAN), a public switched data network (PSDN), the Internet, an intranet, other types of networks, or any combination of the above. Trusted software repository 108 is a secure software repository having contents that are securely protected from access and modification by unauthorized sources. Trusted software repository 108 may include an uncompromised official copy of one or more software applications. Trusted software repository 108 may be a standalone software repository connected to network 102, or may be included as part of backend computing device 104 or another computing device.

Figure 2:
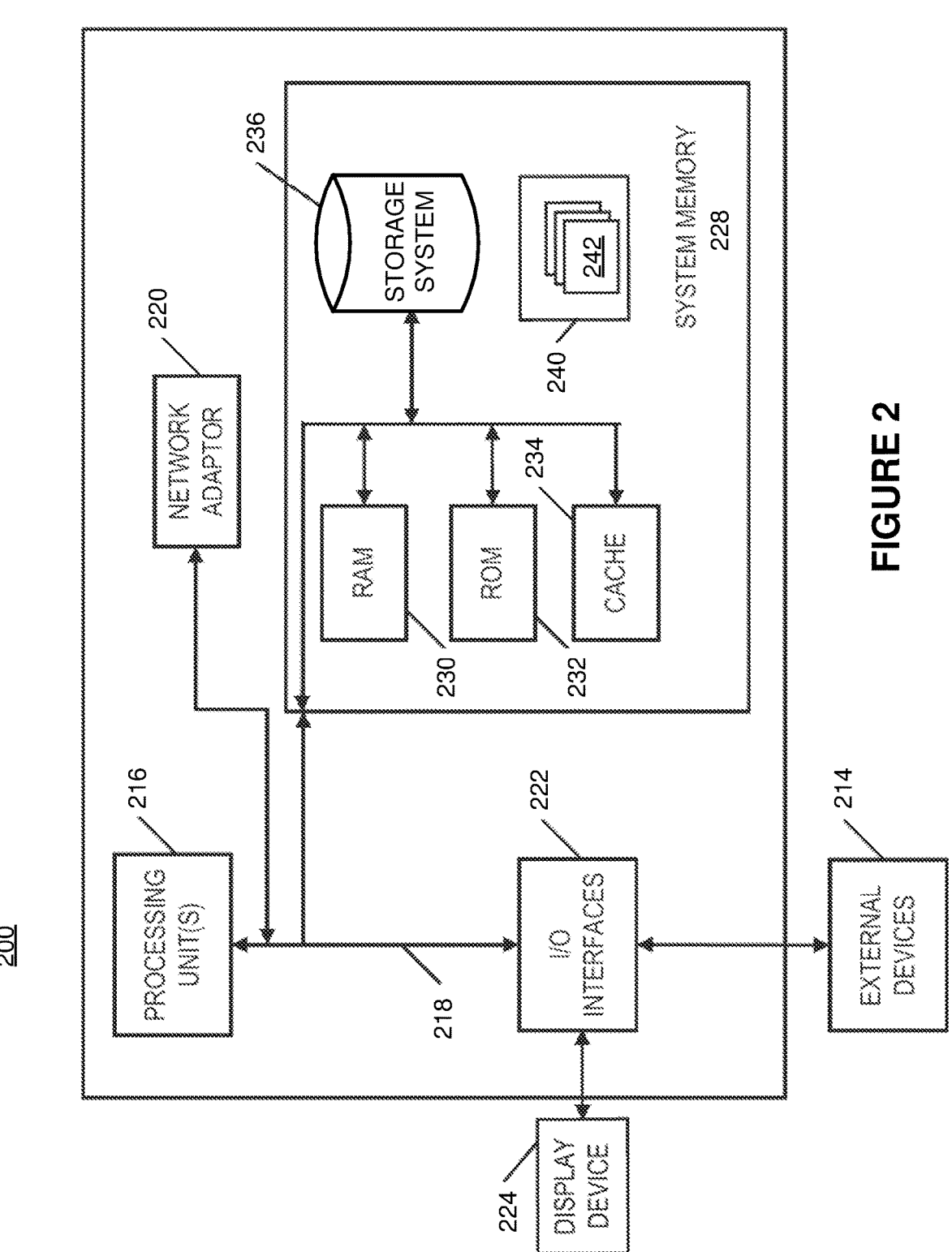
FIG. 2 is a functional block diagram of a computing device that may implement any of a backend computing device and edge computing devices in the various embodiments.

Backend computing device 104 and edge devices 106 may be implemented by respective computing devices. FIG. 2 is a functional block diagram of an example computing device 200 that may implement any of backend computing device 104 and edge computing devices 106. Computing device 200 is shown in a form of a general purpose computing device. Components of computing device 200 may include, but are not limited to, one or more processors or processing units 216, a system memory 228, and a bus 218 that couples various system components including system memory 228 to one or more processors 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing device 200 typically includes a variety of computing device readable media. Such media may be any available media that is accessible by computing device 200, and may include both volatile and non-volatile media, removable and non-removable media.

System memory 228 can include computing device readable media in the form of volatile memory, such as random access memory (RAM) 230 and/or cache memory 234. System memory 228 also can include computing device readable media in the form of non-volatile memory, such as read only memory (ROM) 232. Computing device 200 may further include other removable/non-removable, volatile/non-volatile computing device storage media. By way of example only, storage system 236 can be provided for reading from and writing to a non-removable, non-volatile magnetic media (typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CDROM, DVD-ROM or other optical media can be provided. In such instances, each can be connected to bus 218 by one or more data media interfaces. As will be further depicted and described below, system memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computing device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, computing device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that, although not shown, other hardware and/or software components could be used in conjunction with computing device 200. Examples, include, but are not limited to: microcode, device drivers, redundant processing units, external disk drive arrays, RAID systems, tape drives, and data archival storage systems, etc.

Figure 3:
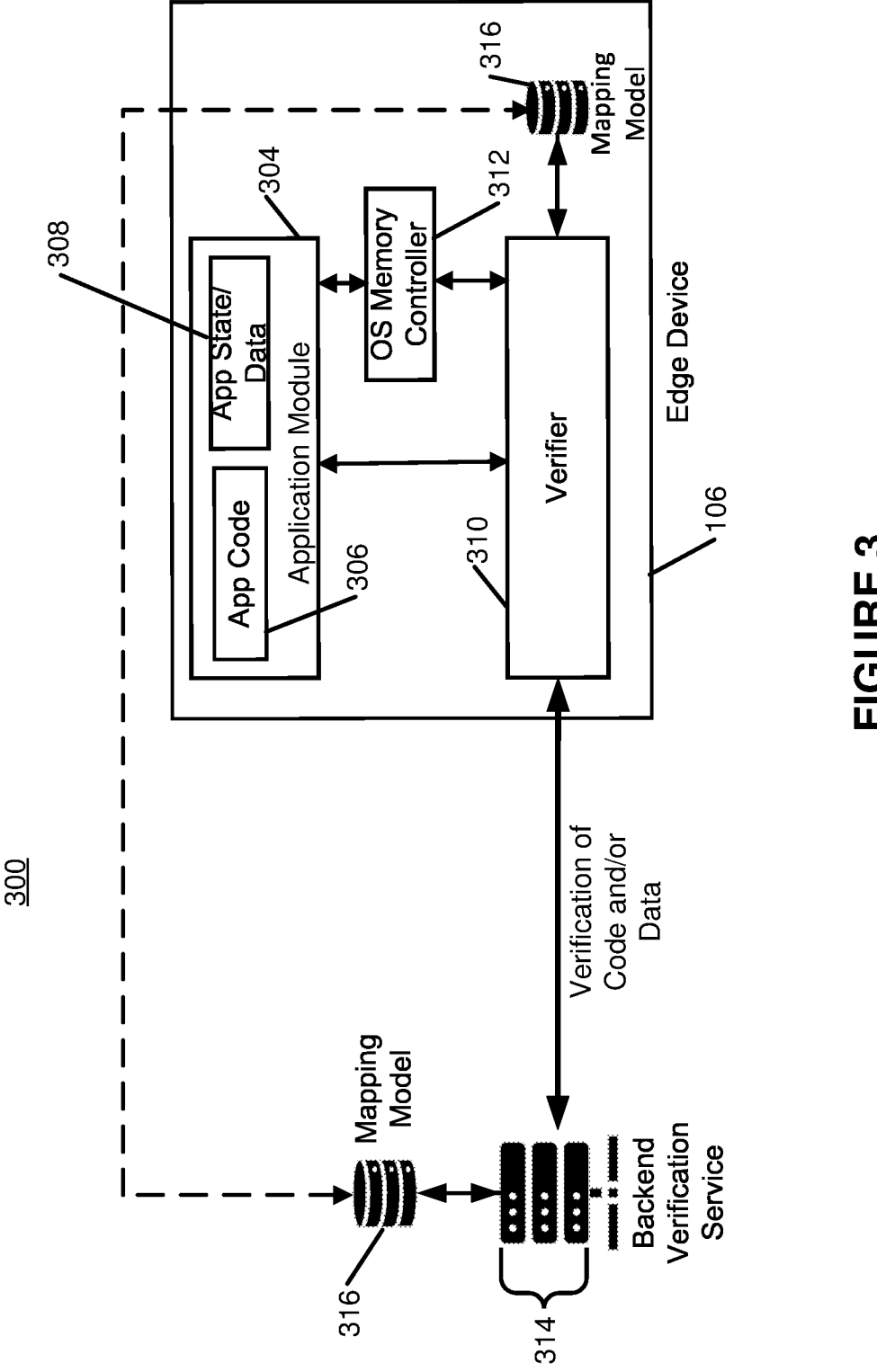
FIG. 3 illustrates an example architecture of an embodiment, showing a detailed architectural view of an edge computing device according to the various embodiments.

FIG. 3 shows an example architecture 300 according to various embodiments showing, in more detail, an architecture of an edge device 106106. Edge device 106 may include an application module 304 of an executing application, a verifier module 310, an operating system (OS) memory controller 312, and a memory mapping model 316. According to the embodiments, one or more backend computing devices 104 included in a backend verification service 314 also may include or use memory mapping model 316. Application module 304 may include application code 306, which further includes computer instructions of the application, and application state and/or data 308, which may include application state information and/or data that may change during execution of the application. In embodiments, application state information and/or data 308 may include data relative to functioning of the application on a device. OS memory controller 312 may be a digital circuit that manages a flow of data to and from memory, which includes application module 304.

Figure 4:
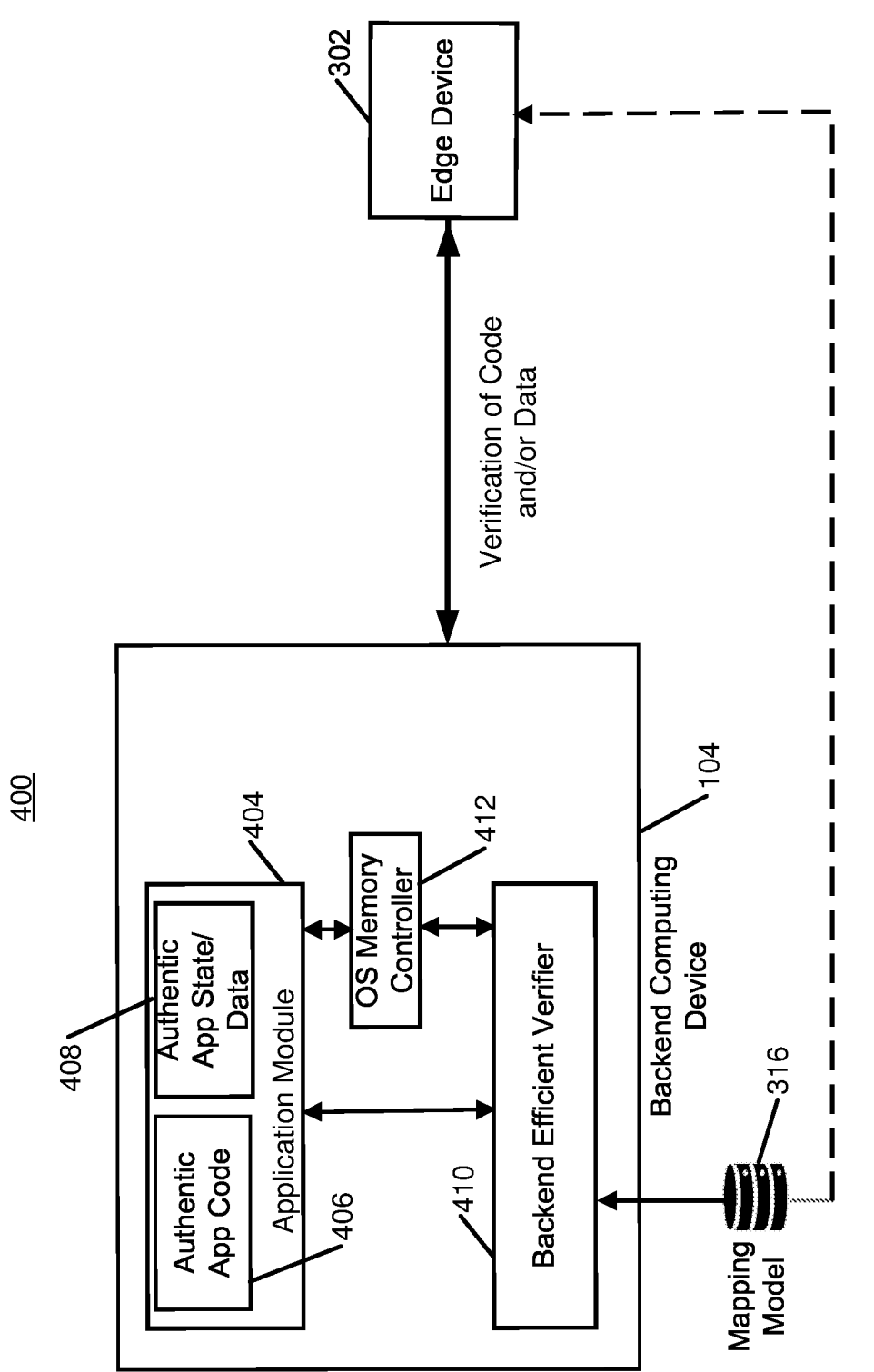
FIG. 4 illustrates an example architecture of an embodiment, showing a detailed architectural view of a backend computing device according to the various embodiments.

FIG. 4 shows an example architecture of an embodiment with more detail regarding an architecture of a backend computing device 104, included in backend verification service 314. Backend computing device 104 may include an application module 404 of an official copy of the application executing on edge computing device 106, a backend verifier module 410, and an OS memory controller 412. Application module 404 may include official application code 406, which further includes computer instructions of the official copy of the application, and official application state and/or data 408, which may include application state information and/or data. OS memory controller 412 may be a digital circuit that manages a flow of data to and from memory, which includes application module 404.

Figure 5:
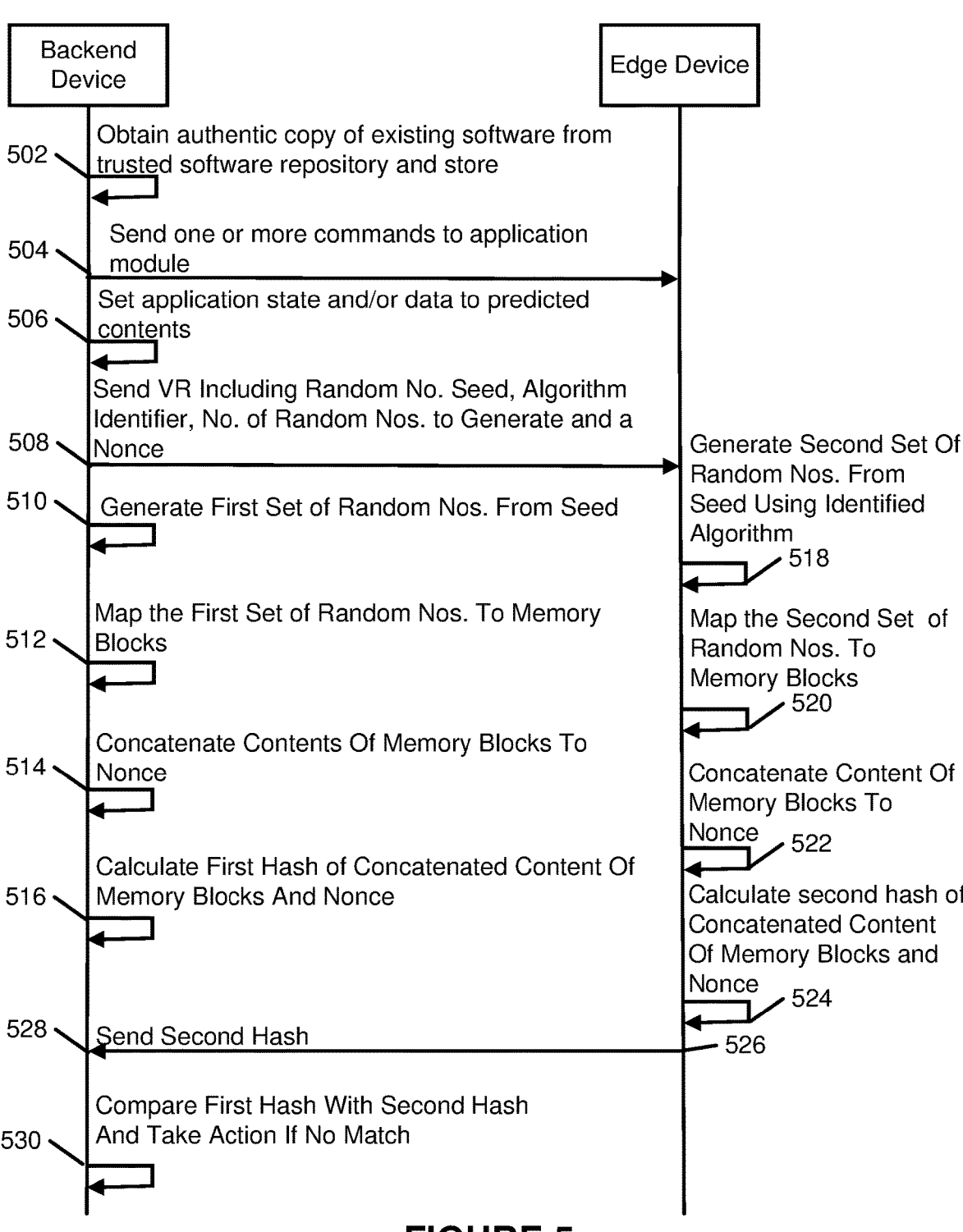
FIG. 5 is an example flow diagram that illustrates communications and processing with respect to backend computing device 104104 and edge device 106106 according to embodiments.

FIG. 5 is an example flow diagram illustrating an example flow of communications and processing with respect to backend computing device 104 and edge device 106 in an embodiment. Backend computing device 104 of backend verification service 314 may obtain and store, from trusted software repository 108, an official copy of an application executing on edge device 106 (act 502), which backend computing device 104 may store in application module 404. In some embodiments, trusted software repository 108 may be a secure database accessible to backend computing devices, but not accessible to edge devices. The secure database may be encrypted in some embodiments.

Computer instructions of the official copy of the application may be stored in application code 406 and initial application state and/or application data of the official copy of the existing application may be stored in application state and/or data 408. In some embodiments, the computer instructions and the initial application state and/or the application data may be pre-stored in application code 406 and application state and/or data 408, respectively. Backend computing device 104 then may send one or more commands to application module 304 executing on edge device 106 such that backend computing device 104 can predict contents of application state and/or code 308 of edge device 106 (act 504). Backend computing device 104 may predict contents of application state and/or code based on having operational knowledge of the application. In some embodiments, the sending of the one or more commands may cause the application to return to backend computing device 104 at least a portion of the application state and/or code. Backend computing device 104 then may set official application state and/or data 408 on backend computing device 104 to the predicted contents (act 506). Backend verifier 410 of backend computing device 104 then may send a validation request to verifier 310 executing on edge device 106 (act 508). The validation request may include a random number seed, an algorithm identifier identifying an algorithm for generating random numbers, a number of random numbers to generate, and a nonce.

Figure 6:
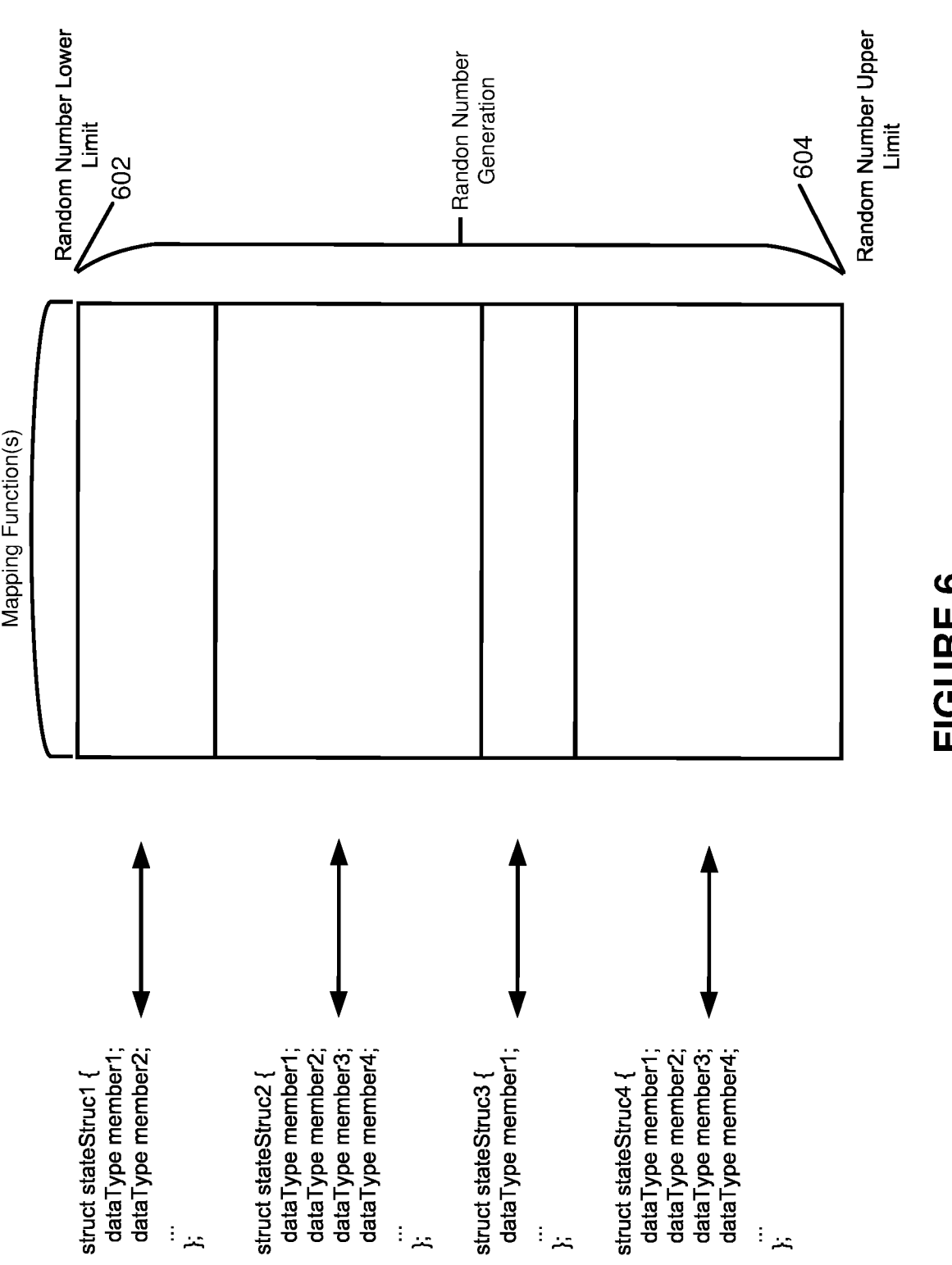
FIG. 6 illustrates an example mapping model for mapping generated random numbers to memory blocks according to embodiments.

Backend verifier 410 then may generate a first set of random numbers according to the number of random numbers to generate specified in the validation request, based on the random number seed and according to the algorithm corresponding to the algorithm identifier (act 510). Any algorithm suitable for generating random numbers may be used to generate the first set of random numbers. As shown in FIG. 6, the generated first set random numbers have a random number lower limit 602 and a random number upper limit 604. Each of generated random numbers of the first set of random numbers may map to a respective memory block in an address space of backend computing device 104 in which the official copy of the application is stored (act 512). The address space may include computer instructions of the application (official copy of application code 406) as well as application state information and/or data 408 that may change during execution of the application.

Under certain circumstances computing a checksum or a hash over run-time data such as, for example, run-time changeable data, may indicate tampering of application code. To account for this possibility, in some embodiments, the algorithm for generating the first set of random numbers may utilize a probability distribution function to bias the mapping of the first set of random numbers to a specific area of a target memory (e.g., in an area having run-time changeable data or in an area having static code). The mapping function may map random numbers that are greater than or equal to random number lower limit 602 and are less than or equal to random number upper limit 604 to memory blocks that can have a length of one byte, a fixed number of bytes, or to a data structure.

Contents of the mapped memory blocks may be concatenated to the nonce (act 514) and a first hash may be calculated over the concatenated contents of the mapped memory blocks and the nonce (act 516).

Upon receiving the validation request from backend computing device 104, verifier 310 of edge device 106 may generate a second set of random numbers according to the number of random numbers to generate specified in the received validation request, based on the random number seed and according to the algorithm corresponding to the algorithm identifier (act 518). Note that verifier 310 uses the same random number seed, the same algorithm for generating the random numbers, and the same number of random numbers to generate the second set of random numbers as was used by backend computing device 104 to generate random numbers.

Next, verifier 310 may map each of the generated random numbers of the second set to a respective memory block in an address space of application module 304 of edge device 106 (act 520). Verifier 310 uses the same mapping function that backend computing device 104 used during act 512. Because verifier 310 uses the same random number seed and the same algorithm for generating the random numbers as was used by backend verifier 410, verifier 310 generates the same random numbers and the same number of random numbers as was generated by backend verifier 410.

Verifier 310 may concatenate contents of the mapped memory blocks of edge device 106 to the nonce (act 522)

and may calculate a second hash over the concatenated content of the mapped memory blocks of edge device 106 and the nonce (act 524). The calculated second hash then may be sent to backend verifier 410 of backend computing device 104 (act 526).

Upon receiving the second hash (act 528), backend verifier 410 of backend computing device 104 may compare the first hash with the second hash and may automatically perform an action if the first hash and the second hash do not match (act 530). Otherwise, if the first hash and the second hash match, application module 304 and the device on which application module 304 resides are considered to be successfully validated. Actions that may be automatically performed when the first hash and the second hash do not match include, but are not limited to: contacting one or more particular individuals to inform them of a corrupted application module 304; sending a command to restart edge device 106 to reload all applications executing thereon; and sending a command to restart edge device 106 to reload all applications executing thereon, reload the official copy of application module 304 onto backend computing device 104, and validate the reloaded application module 304 executing on edge device 106 at a future time.

In various embodiments, backend verifier 410 of backend computing device 104 may validate an executing application on edge device 106 periodically using a different random number seed and a different nonce. In such embodiments, different random numbers may be generated, which map to different memory blocks, the contents of which differ from previously validated memory blocks resulting in a secure validation because hackers cannot know in advance how to respond to a validation request.

As mentioned previously, in some embodiments, a number of different mapping models may be available for mapping generated random numbers to memory blocks of an application. In such embodiments, backend verifier 410 may select one of the mapping models to use. Alternatively, a user of backend computing device 104 may select a mapping model to use via, for example, a graphical user interface (GUI) or other methods. Backend verifier 410 may indicate to verifier 310 to use the selected one of the mapping functions by, for example, including a corresponding mapping model identifier in a validation request sent to verifier 310 of edge device 106.

In some embodiments, the validation request may include a second algorithm identifier corresponding to an algorithm for calculating a hash. In such embodiments, a user of backend computing device 104 may select a hash calculating algorithm via a GUI or other interface. Alternatively, backend computing device 104 may automatically select the hash calculating algorithm.

In some embodiments, edge device 106 may go into hibernation in order to save power. In such embodiments, edge device 106 may not always be connected to a backend computing device 104. However, edge device 106 may determine a hash value, may save the hash value and application state/data 308, and go into hibernation. Upon waking up from hibernation, edge device 106 may recalculate the hash value and compare current application state/data 308 with the saved application state/data 308 and may compare the saved hash value with the recalculated hash value. If the saved and current application state/data are not equal, or the saved and recalculated hash values are not equal, then edge device may automatically perform an action. Examples of an action that may be automatically performed may include, but not be limited to: contacting one or more particular individuals to inform them of a corrupted application module 304; restarting edge device 106 to reload all applications executing thereon; and restarting edge device 106 to reload all applications executing thereon, reload an official copy of the application onto backend computing device 104, and validate the reloaded application executing on edge device 106 at a future time.

Figure 7:
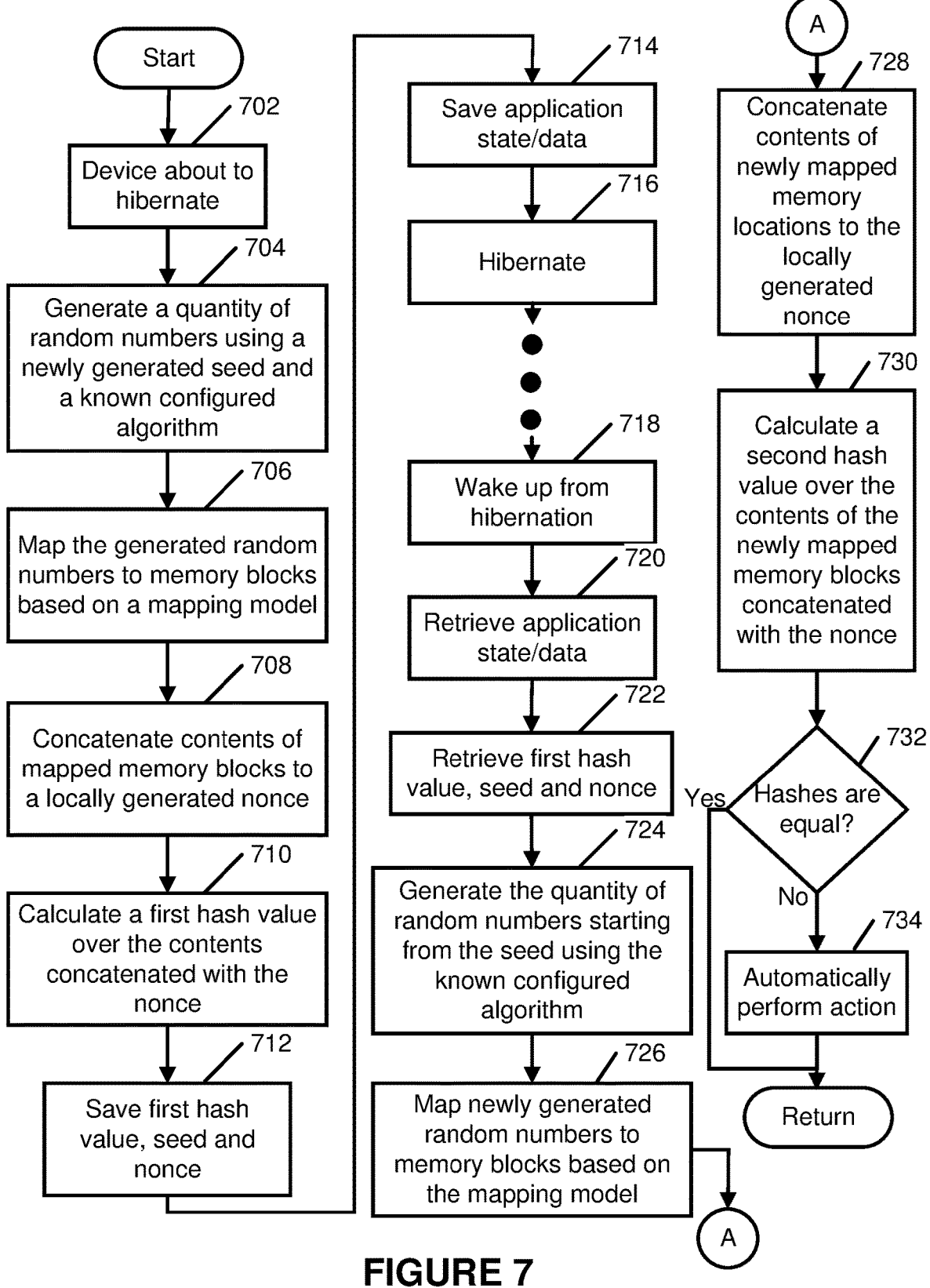
FIG. 7 is a flowchart of an example process that may be performed before an edge device enters a hibernation mode and upon waking from the hibernation mode to determine whether the edge device had been compromised while in the hibernation mode.

FIG. 7 is a flowchart that explains edge device 106 processing before and after entering hibernation mode in such embodiments. The process may begin by edge device 106 determining that it is about to enter hibernation mode (act 702). Before entering hibernation mode, edge device 106 may generate a series of random numbers using a newly generated seed and a known configured algorithm (act 704). A number of random numbers to generate may be previously configured or may be automatically determined by edge device 106. Next, edge device 106 may map, based on a memory mapping model, the series of random numbers to memory blocks that store application code 306 (act 706). The memory blocks may be a fixed size such as, for example, one byte, two bytes, ten bytes, or another number of bytes. Edge device 106 may concatenate contents of the mapped memory blocks to a locally generated nonce (act 708) and may calculate a first hash value over the concatenated contents of the memory blocks and the nonce (act 710). Edge device 106 then may save the first hash value, the seed, and the nonce (act 712), and application state/data 308 (act 714). In some embodiments, the first hash value, the seed, and the nonce, as well as application state/data 308 may be securely saved. For example, the saved values may be encrypted in some embodiments. Edge device 106 then may enter hibernation mode (act 716).

At a future time, edge device 106 may wake up from hibernation mode (act 718) and retrieve the saved application state/data 308 (act 720), and the first hash value, the seed, and the nonce (act 722). Edge device 106 may generate, using the retrieved seed, the nonce, and a same algorithm as was used to generate random numbers before edge device 106 entered hibernation mode (act 724). A quantity of random numbers generated is equal to the number of random numbers generated before entering hibernation mode. Next, edge device 106 may map, based on the mapping model, the newly generated random numbers to memory blocks that include application code 306 (act 726). The mapped memory blocks may be of a same size as the mapped memory blocks before edge device 106 entered hibernation mode. Edge device 106 may concatenate contents of the mapped memory blocks to a locally generated nonce (act 728) and may calculate a second hash value over the concatenated contents of the memory blocks and the nonce (act 730). The first and second hashes are compared to determine whether they are equal (act 732) and if they are not equal, edge device 106 may automatically perform an action (act 734). The action may include, but not be limited to: contacting one or more particular individuals to inform them of a corrupted application module 304; and restarting edge device 106 to reload all applications executing thereon.

The computing devices or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flow diagrams illustrated in the drawings. Further, any references herein of software performing various functions generally refer to computer systems or processors performing those functions under software control. The computer systems of the present invention embodiments may alternatively be implemented by any type of hardware and/or other processing circuitry.

The software and/or algorithms described above and illustrated in the flow diagrams may be modified in any manner that accomplishes the functions described herein. In addition, the functions in the flow diagrams or description may be performed in any order that accomplishes a desired operation.

The software of the present invention embodiments may be available on a non-transitory computer readable medium (e.g., magnetic or optical mediums, magneto-optic mediums, floppy diskettes, CD-ROM, DVD, memory devices, etc.) of a stationary or portable program product apparatus or device for use with systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to a server. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CDROM), a digital versatile disk (DVD), a memory stick, a floppy disk, a mechanically encoded device such as punch cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Small talk, C++, or the like, and procedural programming languages, such as the "C" programming language or similar programming languages.

Aspects of the present invention are described herein with reference to a flow diagram and/or block diagrams of methods, apparatus (systems), and computer program products according to embodiments of the invention. It will be understood that each act of the flow diagram and/or block diagrams can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow diagram.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow diagram.

The flow diagram and block diagrams in the Figures illustrate the architecture, functionality, and operation of possible implementations of systems, methods, and computer program products according to various embodiments. In this regard, each act in the flow diagram and the block diagrams may represent a module, segment, or portion of instructions, which comprises one or more executable instructions for implementing the specified logical function(s). In some alternative implementations, the functions noted in the acts and blocks may occur out of the order noted in the Figures. For example, two acts shown in succession may, in fact, be executed substantially concurrently, or the blocks may sometimes be executed in the reverse order, depending upon the functionality involved. It will also be noted that each block of the block diagrams and/or acts in the flow diagram, and combinations of acts, can be implemented by special purpose hardware-based systems that perform the specified functions or acts or carry out combinations of special purpose hardware and computer instructions.

The invention claimed is:

1. A method for validating a state of a second processing device, the method comprising:

sending, by a first processing device to the second processing device via at least one network, a validation request including a random number seed and a nonce;

generating, by the first processing device, a first set of random numbers using the random number seed according to an algorithm for random number generation;

mapping, by the first processing device and based on a mapping model, the generated first set of random numbers to a set of memory blocks comprising a copy of software for the second processing device;

concatenating, by the first processing device, contents of the set of mapped memory blocks to the nonce;

calculating, by the first processing device, a first hash of the contents of the set of mapped memory blocks concatenated to the nonce;

receiving, by the first processing device from the second processing device, a second hash in response to the sending of the validation request, the second hash having been calculated by the second processing device using information included in the validation request, the mapping model, the software for the second processing device, and the nonce;

comparing, by the first processing device, the first hash to the second hash; and automatically performing an action, by the first processing device, when the first hash and the second hash do not match.

2. The method of claim 1, further comprising:

receiving, by the second processing device from the first processing device, the validation request;

generating, by the second processing device in response to the receiving of the validation request, a second set of random numbers using the random number seed according to the algorithm for random number generation, a quantity of the random numbers in the generated second set of random numbers being equal to a quantity of the random numbers generated by the first processing device;

mapping, by the second processing device and based on the mapping model, the generated second set of random numbers to a set of memory blocks of the second processing device, the set of mapped memory blocks of the second processing device indicating a running state of the second processing device;

concatenating, by the second processing device, contents of the set of mapped memory blocks of the second processing device to the nonce;

calculating, by the second processing device, the second hash of the contents of the set of mapped memory blocks of the second processing device concatenated to the nonce; and sending, by the second processing device to the first processing device, the second hash.

3. The method of claim 2, wherein:

the algorithm for random number generation is more likely to generate random numbers that map to memory blocks that include data rather than random numbers that map to memory blocks that include computer instructions.

4. The method of claim 1, wherein:

the validation request further includes at least one of: an algorithm identifier corresponding to an algorithm for random number generation, a quantity of random numbers to generate, or a model identifier corresponding to one of a plurality of mapping models for mapping generated random numbers to memory blocks.

5. The method of claim 1, wherein:

the validation request further includes an algorithm identifier corresponding to an algorithm for producing a hash.

6. The method of claim 5, wherein the calculating of the first hash uses the algorithm for producing a hash corresponding to the algorithm identifier.

7. The method of claim 1, wherein the automatically performing an action further comprises:

automatically sending a command to restart the second processing device.

8. The method of claim 1, wherein the memory blocks have a fixed size.

9. The method of claim 1, wherein the generating of the first set of random numbers utilizes a probability distribution function to cause the generated first set of random numbers to likely be mapped to a specific area of the memory blocks.

10. A system for validating a state of a second processing device comprising:

a first processing device including at least one first processor and a first memory, the first memory including computer-readable instructions that, when executed by the at least one first processor, cause the first processing device to perform first operations comprising:

sending via at least one network a validation request including a random number seed and a nonce;

generating a first set of random numbers using the random number seed according to an algorithm for random number generation;

mapping, based on a mapping model, the generated first set of random numbers to a set of memory blocks comprising a copy of software for the second processing device;

concatenating contents of the set of mapped memory blocks to the nonce;

calculating a first hash of the contents of the set of mapped memory blocks concatenated to the nonce;

receiving, from the second processing device, a second hash in response to the sending of the validation request, the second hash having been calculated by the second processing device using information included in the validation request, the mapping model, the software for the second processing device, and the nonce;

comparing the first hash to the second hash; and automatically performing an action when the first hash and the second hash do not match.

11. The system of claim 10, wherein:

the second processing device includes at least one second processor and a second memory, the second memory including one or more computer-readable instructions that, when executed by the at least one second processor, cause the second processing device to perform second operations comprising:

receiving, from the first processing device, the validation request;

generating, in response to the receiving of the validation request, a second set of random numbers using the random number seed according to the algorithm for random number generation, a quantity of the random numbers in the generated second set of random numbers being equal to a quantity of the random numbers generated by the first processing device;

mapping, based on the mapping model, the generated second set of random numbers to a set of memory blocks of the second processing device, the set of mapped memory blocks of the second processing device indicating a running state of the second processing device;

concatenating contents of the set of mapped memory blocks of the second processing device to the nonce;

calculating the second hash of the contents of the set of mapped memory blocks of the second processing device concatenated to the nonce; and sending, to the first processing device, the second hash.

12. The system of claim 11, wherein:

the algorithm for random number generation is more likely to generate random numbers that map to memory blocks that include data rather than random numbers that map to memory blocks that include computer instructions.

13. The system of claim 10, wherein:

the validation request further includes at least one of: an algorithm identifier corresponding to an algorithm for random number generation, a quantity of random numbers to generate, or a model identifier corresponding to one of a plurality of mapping models for mapping generated random numbers to memory blocks.

14. The system of claim 10, wherein:

the validation request further includes an algorithm identifier corresponding to an algorithm for producing a hash, and the calculating of the first hash uses the algorithm for producing a hash corresponding to the algorithm identifier to calculate the first hash.

15. The system of claim 10, wherein the automatically performing an action further comprises:

automatically sending a command to restart the second processing device.

16. The system of claim 10, wherein the memory blocks have a fixed size.

17. The system of claim 10, wherein the generating of the first set of random numbers utilizes a probability distribution function to cause the generated first set of random numbers to likely be mapped to a specific area of the memory blocks.

18. A non-transitory computer-readable storage medium having first instructions and second instructions recorded thereon for validating a second processing device, wherein when the first instructions are executed on a first processing device, the first instructions cause the first processing device to perform first operations comprising:

sending via at least one network a validation request including a random number seed and a nonce;

generating a first set of random numbers using the random number seed according to an algorithm for random number generation;

mapping, based on a mapping model, the generated first set of random numbers to a set of memory blocks comprising a copy of software for the second processing device;

concatenating contents of the set of mapped memory blocks to the nonce;

calculating a first hash of the contents of the set of mapped memory blocks concatenated to the nonce;

receiving, from the second processing device, a second hash in response to the sending of the validation request, the second hash having been calculated by the second processing device using information included in the validation request, the mapping model, the software for the second processing device, and the nonce;

comparing the first hash to the second hash; and automatically performing an action when the first hash and the second hash do not match.

19. The non-transitory computer-readable medium of claim 18, wherein when the second processing device executes the second instructions, the second instructions cause the second processing device to perform second operations comprising:

receiving, from the first processing device, the validation request;

generating, in response to the receiving of the validation request, a second set of random numbers using the random number seed according to the algorithm for random number generation, a quantity of the random numbers in the generated second set of random numbers being equal to a quantity of the random generated by the first processing device;

mapping, based on the mapping model, the generated second set of random numbers to a set of memory blocks of the second processing device, the set of mapped memory blocks of the second processing device indicating a running state of the second processing device;

concatenating contents of the set of mapped memory blocks of the second processing device to the nonce;

calculating the second hash of the contents of the set of mapped memory blocks of the second processing device concatenated to the nonce; and sending, to the first processing device, the second hash.

20. The non-transitory computer-readable medium of claim 19, wherein the algorithm for random number generation is more likely to generate random numbers that map to memory blocks that include data rather than random numbers that map to memory blocks that include computer instructions.

21. The non-transitory computer-readable medium of claim 18, wherein:

the validation request further includes at least one of: an algorithm identifier corresponding to an algorithm for random number generation, a quantity of random numbers to generate, or a model identifier corresponding to one of a plurality of mapping models for mapping generated random numbers to memory blocks.

22. The non-transitory computer-readable medium of claim 18, wherein the automatically performing an action further comprises:

sending a command to restart the second processing device.

23. The non-transitory computer-readable medium of claim 19, wherein:

the generated first set of random numbers and the generated second set of random numbers are within a range of numbers that are greater than or equal to a random number lower limit and less than or equal to a random number upper limit.

* * * * *